United States Patent
Fong et al.

(10) Patent No.: US 10,878,795 B2
(45) Date of Patent: Dec. 29, 2020

(54) AUDIO PATH SEALING

(71) Applicant: PPIP LLC, Tempe, AZ (US)

(72) Inventors: Michael Fong, Chandler, AZ (US);
Neric Hsin-wu Fong, Tempe, AZ (US);
Teddy David Thomas, Bedford, NH (US); Haydn Bennett Taylor, Detroit, MI (US)

(73) Assignee: PPIP, LLC, Tempe, AZ (US)

( * ) Notice: Subject to any disclaimer, the term of this patent is extended or adjusted under 35 U.S.C. 154(b) by 0 days.

(21) Appl. No.: 16/272,960

(22) Filed: Feb. 11, 2019

(65) Prior Publication Data

US 2020/0058283 A1 Feb. 20, 2020

Related U.S. Application Data

(60) Provisional application No. 62/630,130, filed on Feb. 13, 2018.

(51) Int. Cl.
| | | |
|---|---|---|
| *H03G 3/20* | (2006.01) | |
| *H04R 29/00* | (2006.01) | |
| *G10K 11/175* | (2006.01) | |
| *G06F 1/18* | (2006.01) | |
| *G06F 21/60* | (2013.01) | |

(Continued)

(52) U.S. Cl.
CPC ............ *G10K 11/175* (2013.01); *G06F 1/182* (2013.01); *G06F 21/60* (2013.01); *H04L 9/0631* (2013.01); *H04L 9/14* (2013.01); *H04R 1/025* (2013.01); *H04R 1/288* (2013.01); *H04R 29/001* (2013.01); *G06F 7/588* (2013.01); *G06F 21/76* (2013.01); *H04L 2209/04* (2013.01); *H04L 2209/08* (2013.01)

(58) Field of Classification Search
CPC .... H04R 2420/07; H04R 1/025; H04R 1/288; H04R 29/001; G10K 11/175; G06F 1/182; G06F 21/60; G06F 7/588; G06F 21/76; H04L 9/0631; H04L 9/14; H04L 2209/04; H04L 2209/08
USPC ..................................... 381/57, 58
See application file for complete search history.

(56) References Cited

U.S. PATENT DOCUMENTS

| | | | |
|---|---|---|---|
| 2003/0144848 A1* | 7/2003 | Roy ..................... | G10K 11/175 704/500 |
| 2014/0161273 A1* | 6/2014 | Soufan ..................... | H04K 3/43 381/73.1 |

(Continued)

*Primary Examiner* — Ammar T Hamid
(74) *Attorney, Agent, or Firm* — Fernando & Partners, LLP

(57) ABSTRACT

In accordance with some embodiments, an apparatus for privacy protection is provided. The apparatus includes a first housing portion and a second housing portion arranged to receive and enclose one or more personal communication devices. The apparatus further includes at least one sound attenuation layer disposed in the second housing portion, the at least one sound attenuation layer absorbs sound. The apparatus also includes a noise generator to provide one or more noise signal streams and audio output device(s), which are at least partially supported by the first housing portion and coupled to the noise generator to receive the one or more noise signal streams. The audio output device(s) are operable to output noise signal based on the one or more noise signal streams and direct the noise signal at the one or more personal communication devices placed adjacent the at least one sound attenuation layer.

20 Claims, 6 Drawing Sheets

(51) Int. Cl.
*H04L 9/06* (2006.01)
*H04L 9/14* (2006.01)
*H04R 1/28* (2006.01)
*H04R 1/02* (2006.01)
G06F 21/76 (2013.01)
G06F 7/58 (2006.01)

(56) References Cited

U.S. PATENT DOCUMENTS

2016/0098983 A1* 4/2016 Lehmann ............... H04M 1/04
 455/575.1
2018/0357995 A1* 12/2018 Lee ..................... G10L 25/18

* cited by examiner

AUDIO PATH SEALING

PRIORITY CLAIM

This application claims priority to U.S. provisional patent application No. 62/630,130 filed on Feb. 13, 2018, the contents of which are hereby incorporated by reference.

TECHNICAL FIELD

This relates generally to the field of privacy protection, and more specifically to an apparatus that seals the audio path of enclosed devices.

BACKGROUND

Smartphones have sensors for collecting information of or about a user. For example, microphones on smartphones can be used to record a user's conversation. Often, smartphones also have radios for local or remote communications, such as a cellular radio, a WiFi radio, and/or a Bluetooth radio. Together, the sensors and radios can reveal a wealth of user information to third parties. For example, utilizing the microphones and the communication devices on a smart phone, the third parties can eavesdrop from a remote location. Previously existing systems, methods, and devices are inadequate in controlling the signals along the signal propagation path. Consequently, when the third-parties (e.g., hackers) gain unwanted access to a smartphone, the user may not be aware of the privacy invasion.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

Figure 1:
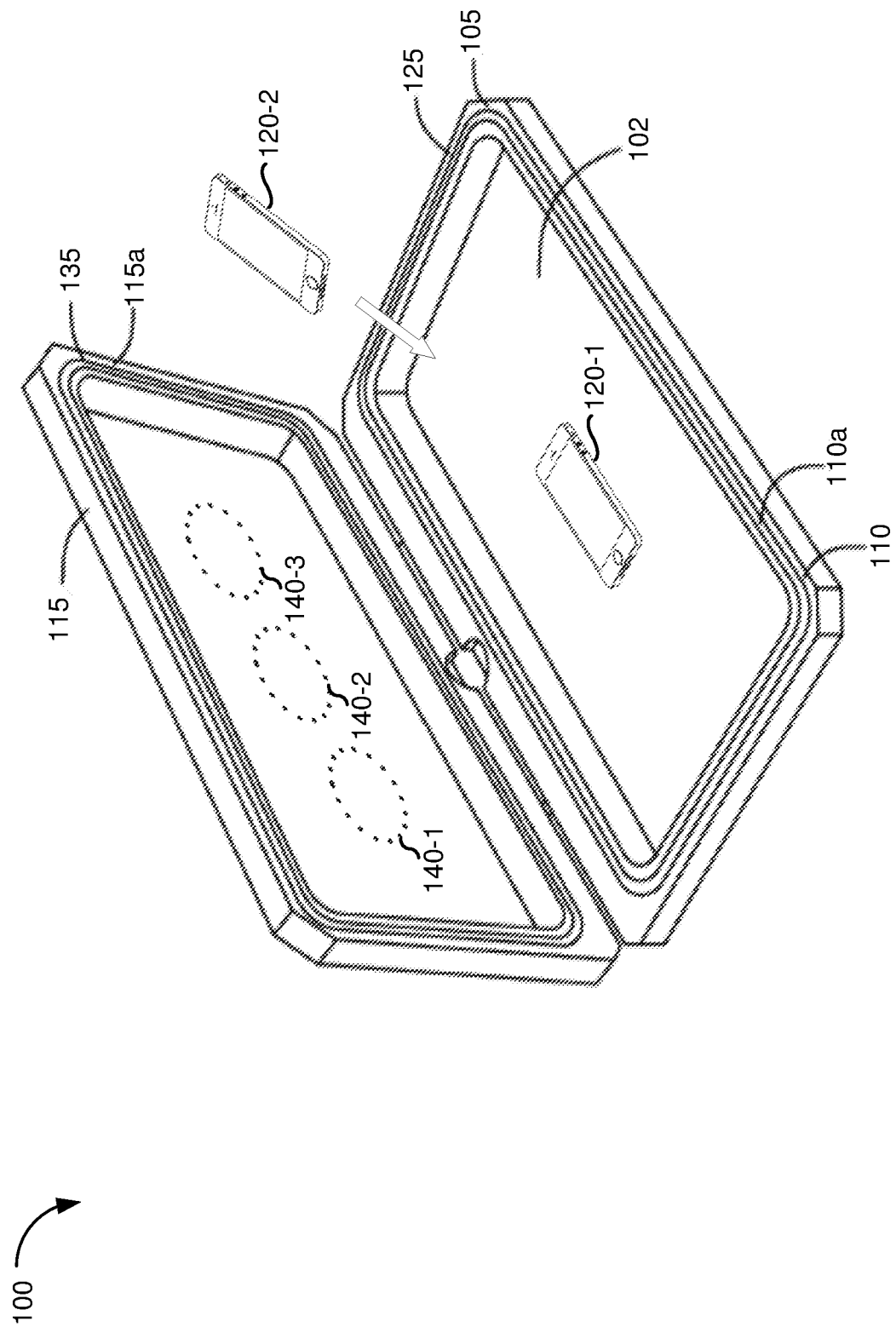
FIG. 1 is a block diagram of an exemplary apparatus for privacy and/or security protection of one or more personal communication devices in accordance with some embodiments.

In accordance with common practice the various features illustrated in the drawings cannot be drawn to scale. Accordingly, the dimensions of the various features can be arbitrarily expanded or reduced for clarity. In addition, some of the drawings cannot depict all of the components of a given system, method or device. Finally, like reference numerals can be used to denote like features throughout the specification and figures.

DETAILED DESCRIPTION

Accordingly, described herein is an apparatus that seals the audio path of enclosed devices. In some embodiments, the apparatus includes physical structures that provide passive acoustical attenuation. In some embodiments, the apparatus includes mateable portions, such as a first housing portion (e.g., a lid or a cover) and a second housing portion (e.g., a bottom shell). When the first housing portion and the second housing portion are matingly engaged (e.g., closing the lid or moving the cover to cover the bottom), an enclosure is formed. The enclosure can receive and hold one or more personal communication devices. The physical barrier formed by the first housing portion and the second housing portion blocks, absorbs and/or attenuates sound waves, thus provides passive acoustical attenuation to the enclosed devices. In some embodiments, the apparatus also includes a seal (e.g., grooves) and/or sound attenuation layer to provide further passive acoustical attenuation. In addition to the passive acoustical attenuation, the apparatus provides active acoustical attenuation. The active acoustical attenuation is provided by including a noise generator and one or more output devices. The noise generator generates one or more noise signal streams; and the one or more output devices output a masking signal as a function of the one or more noise signal streams. In some embodiments, the noise signal is directed at the one or more personal communication devices inside the enclosure, so that the noise signal masks sound (e.g., the ambient sound from outside the enclosure) recorded by the one or more personal devices. As such, the apparatus seals the audio path to the one or more personal communication devices in the enclosure and protects users of the one or more personal communication devices against unwanted privacy invasion.

In accordance with some embodiments, the apparatus comprises a first housing portion and a second housing portion arranged to receive and enclose one or more personal communication devices. In some embodiments, the apparatus also includes at least one sound attenuation layer, disposed in the second housing portion, the at least one sound attenuation layer absorbs sound. In some embodiments, the apparatus also includes a noise generator operable to provide one or more noise signal streams. In addition, in some embodiments, the apparatus includes one or more audio output devices, at least partially supported by the first housing portion and coupled to the noise generator to receive the one or more noise signal streams, operable to output masking signals based on the one or more noise signal streams and direct the noise signal at the one or more personal communication devices placed adjacent the at least one sound attenuation layer.

In accordance with some embodiments, a device includes one or more processors, non-transitory memory, and one or more programs; the one or more programs are stored in the non-transitory memory and configured to be executed by the one or more processors, and the one or more programs include instructions for performing or causing performance of the operations of any of the methods described herein. In accordance with some embodiments, a non-transitory computer readable storage medium has stored therein instructions which, when executed by one or more processors of a device, cause the device to perform or cause performance of the operations of any of the methods described herein. In accordance with some embodiments, a device includes means for performing or causing performance of the operations of any of the methods described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when", "upon", "in response to determining", or "in response to detecting", depending on the context. Similarly, the phrase "if it is determined" or "if [a stated condition or event] is detected" is, optionally, construed to mean "upon determining", "in response to determining", "upon detecting [the stated condition or event]," or "in response to detecting [the stated condition or event]," depending on the context.

It should be appreciated that in the development of any actual embodiments (as in any development project), numerous decisions must be made to achieve the developers' specific goals (e.g., compliance with system and business-related constraints), and that these goals will vary from one embodiment to another. It will also be appreciated that such development efforts might be complex and time consuming, but would nevertheless be a routine undertaking for those of ordinary skill in the art of image capture having the benefit of this disclosure.

Referring to FIG. 1, FIG. 1 is a perspective view of an apparatus 100 for privacy and/or security protection of one or more personal communication devices 120, in accordance with some embodiments. In some embodiments, the one or more personal communication devices 120 (also known as user equipment) that are protected by the apparatus 100 can be a mobile or stationary communication device, including, but not limited to, a cellular phone, a smart phone, a car microphone, a paging device, a wearable device (e.g., a smartwatch), a computer (e.g., a tablet or a laptop), a portable or stationary gaming device, a portable or stationary video or audio device, and/or a combination of the devices described herein. In some embodiments, each personal communication device 120 has communication capabilities and is able to collect information of the surroundings. For example, each personal communication device 120 can include an radio frequency (RF) transceiver, an audio input device, an audio output device, a video input device, a video output device, a near-field communication (NFC) device, a Bluetooth (BL)/Bluetooth low energy (BLE) radio, a WiFi modem, and/or a radio-frequency identification (RFID) device, an accelerometer, a gyroscope, a magnetometer (e.g., as part of an inertial measurement unit (IMU)), a light sensor, and/or acoustic sensors, etc. The information (e.g., audio/video information), once collected by the personal communication device 120, can be transmitted to a remote source using communication interfaces of the personal communication device 120.

For example, the remote communication interface can use any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), wideband code division multiple access (W-CDMA), code division multiple access (CDMA), time division multiple access (TDMA), and/or Wi-Fi (e.g., IEEE 802.11a, IEEE 802.11b, IEEE 802.11g, IEEE 802.11n, and/or IEEE 802.11ac), or any other suitable communication protocol, including communication protocols not yet developed as of the filing date of this document.

In order to protect the one or more personal communication devices 120, in some embodiments, the apparatus 100 includes a housing assembly 105, which further includes a first housing portion 115 (e.g., a lid or a cover) and a second housing portion 110 (e.g., a base portion). The housing assembly 105 can be at least partially moved, adjusted, opened, or closed to adjust a level of the privacy and/or security protection. In some embodiments, the first housing portion 115 and/or the second housing portion 110 are made of rigid, semi-rigid, and/or structurally self-supporting materials. When the apparatus 100 is open, as shown in FIG. 1, an inner region 102 (also known as an enclosure when the housing assembly 105 is closed) enclosed by the second housing portion 110 can receive and hold the one or more personal communication devices 120. In FIG. 1, the personal communication device 120-1 is placed inside the inner region 102 and the personal communication device 120-2 is about to be placed inside the inner region 102. Once placed inside the inner region 102, the one or more personal communication devices 120 are supported by the housing assembly 105 of the apparatus 100, and the surface of the inner region 102 can cradle the one or more personal communication devices 120, in accordance with some embodiments.

In some embodiments, when the first housing portion 115 matingly engages the second housing portion 110, the housing assembly 105 can at least partially block sensing and/or communication capabilities of the enclosed personal communication devices 120. In other words, the apparatus 100 can at least partially block the monitoring and surveillance of the enclosed personal communication devices 120 from outside the housing assembly 105. For example, the first and second housing portions 115 and 110 can form a clamshell type enclosure, such that the top shell is connected with the lower shell and the enclosure is formed by closing together the top shell and bottom shell around a pivot point or a hinge. As such, when the apparatus 100 is closed, the top shell and the bottom shell sandwich the one or more personal communication devices 120 in between the space between the top shell and the bottom shell. In such configuration, the top shell 115 and the bottom shell 110 can be matingly coupled and/or engaged. Accordingly, when the lid 115 is closed, the housing assembly 105 of the apparatus 100 can prevent, reduce, or limit the microphone's ability to capture audio content. In other words, when the lid 115 is closed, the closed clamshell shaped housing assembly 105 can prevent, reduce, or limit the sound outside the enclosure 102 from being monitored through the one or more enclosed personal communication devices 120.

In some embodiments, one or more grooves within a portion of the apparatus 100 provide at least partial sealing of the enclosure 102. For example, a dual groove structure or a single groove can be implemented to form an environmental barrier to substantially attenuate or at least partially block the propagation of acoustic signal. In some embodiments, one groove 125 can extend at least partially around an edge 110a of the second housing portion 110, and another groove 135 can extend at least partially around an edge 115a of the first housing portion 115. The groove 125 extending around the edge 110a of the second housing portion 110 and the groove 135 extending around the edge 115a of the first housing portion 115 are arranged to matingly engage when the apparatus 100 is closed. As such, the physical barrier formed by the sealing structure, including the grooves 125 and 135, provides further passive acoustical attenuation.

In addition to the passive acoustical attenuation, in some embodiments, the apparatus 100 actively weaken the ability of various sensors of the one or more enclosed personal communication devices 120 from collecting information, e.g., at least partially masks, blocks, attenuates, distorts, confuses, reduces, and/or eliminates the information being collected by the sensors of the personal communication devices 120. For example, the apparatus 100 can include speakers 140 that at least partially mask, distort, confuse, reduce, and/or eliminate the ability of the microphones of the enclosed personal communication devices 120, as will be described below in detail.

Though FIG. 1 illustrates rigid housing, in some embodiments, at least some portion of the structurally self-supporting enclosure 102 can comprise a flexible and/or compliant material. For example, the material can include at least one of cloth or fabric, a polymer or polymer composite film or sheet, or other flexible material. In such embodiments, the enclosure 120 can be structurally supported by the one or more enclosed personal communication devices 120. For example, the apparatus 100 can be a flexible bag, which can be laid flat or folded when empty, but can be configured to expand to fit the one or more personal communication devices 120 inside.

Figure 2:
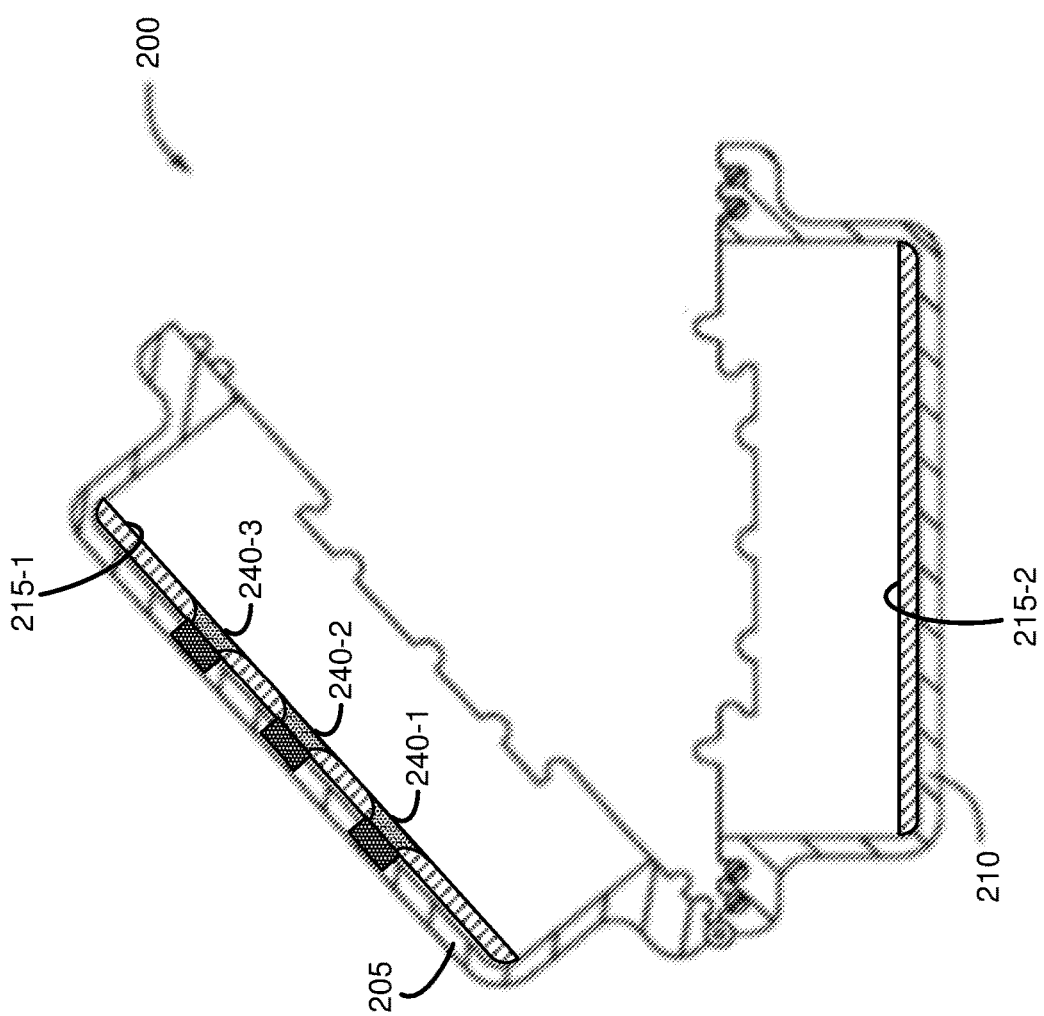
FIG. 2 is a cross-sectional view of an apparatus with liners for privacy and/or security protection of one or more personal communication devices in accordance with some embodiments.

FIG. 2 illustrates a cross-sectional view of an apparatus 200 with liners 215 for privacy and/or security protection of one or more personal communication devices (e.g. the personal communication devices 120, FIG. 1), in accordance with some embodiments. As explained above with reference to FIG. 1, in some embodiments, the apparatus 200 for privacy and security protection includes a housing assembly (e.g., the housing assembly 105, FIG. 1), which further comprises a first housing portion (e.g., a lid portion 205) and a second housing portion (e.g., a base portion 210). In addition to the physical barrier formed by the housing assembly for privacy and/or security protection, in some embodiments, the liners 215 provide further passive acoustical attenuation.

In some embodiments, the liners 215 are attached to the housing assembly of the apparatus 200. For example, the liner 215-1 is positioned in the lid portion 205, and the liner 215-2 is positioned in the base portion 210. In some embodiments, the liners 215 are shaped to fit seamlessly from the outer periphery of the housing portions 205 and 210. In such embodiments, when the apparatus 200 is closed, the liners 215 form an inner storage cavity shaped to cradle and/or surround the enclosed personal communication device (e.g., the one or more personal communication devices 120, FIG. 1). In some embodiments, each of the liners 215 can have at least one sound attenuation layer, which is made of acoustic shielding material to prevent, reduce, or limit the sound waves from passing the sound attenuation layer. As such, the lines 215 shield the enclosed personal communication device from capturing ambient sound from outside the enclosure. Further, the liners 215 prevent the sound generated inside the enclosure (e.g., masking signals) from escaping the enclosure.

For example, the liners 215 can have one or more slots, windows, or openings to at least partially support devices for active acoustical attenuation, e.g., to at least partially support speakers 240-1, 240-2, and 240-3. The openings allow the masking signals outputted by the speakers 240 to pass into the enclosure. The masking signals provide active acoustical attenuation, as will be described below with reference to FIGS. 4 and 5. In some embodiments, the speakers 240 output the masking signals that are directed to the one or more personal communication devices placed on the surface of the liners 215. In such embodiments, the sound attenuation layer of the liners 215 can reduce the amount of noise from leaking out of the enclosure, thereby reducing the obtrusiveness of the masking signal to the outside environment.

Though FIG. 2 illustrates the liners 215 inside the apparatus 200, in some embodiments, the acoustic shielding layer can be placed on the outside surface of the apparatus 200 (e.g., as a cover material) or embedded in the enclosure shell of the apparatus 200. Further, though FIG. 2 illustrates the liners 215 covering a portion of the inner surface the apparatus according to some embodiments, the acoustic shielding layer can extend across an entire inner surface of the apparatus 200. Additionally, the liners 215 can be substantially continuous or discontinuous (i.e., it can be patterned and/or can contain gaps or apertures of various sizes).

Figure 3:
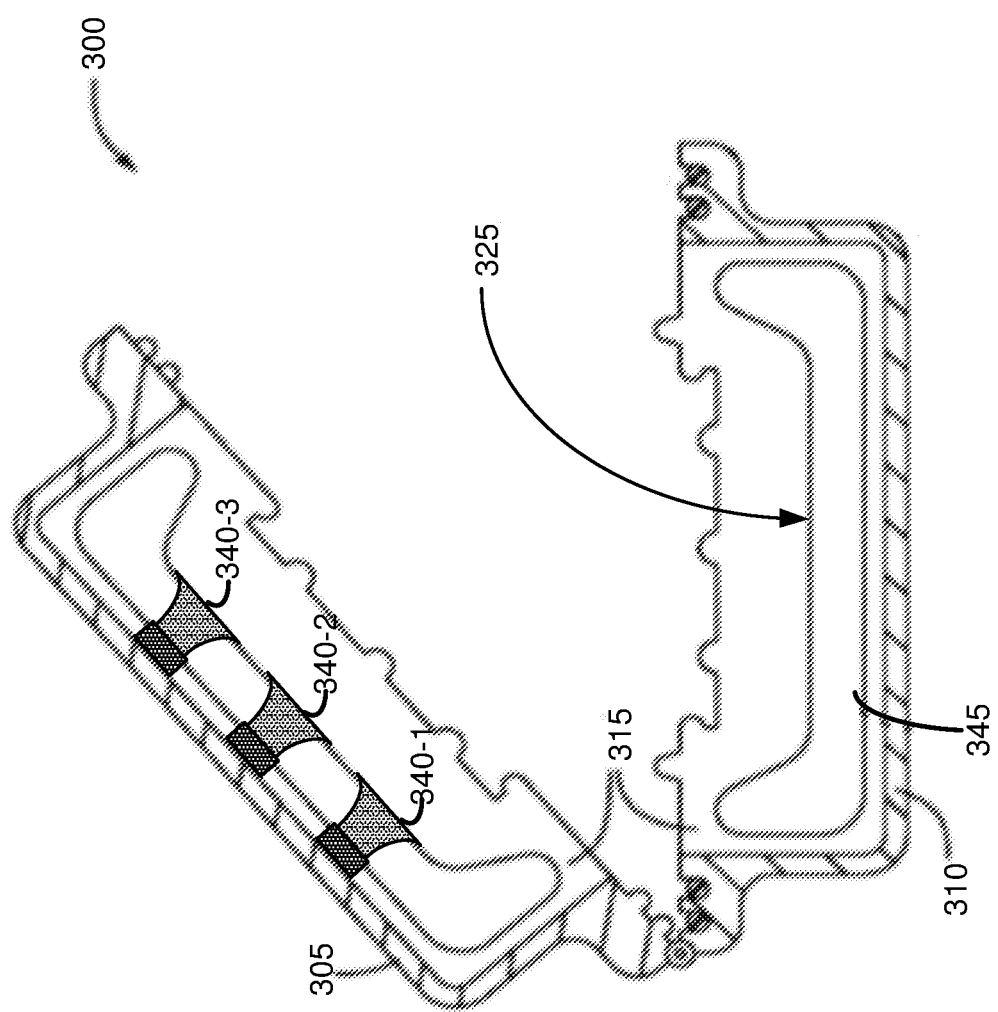
FIG. 3 is a cross-sectional view of an apparatus with vibration-damping foam for privacy and/or security protection of one or more personal communication devices in accordance with some embodiments.

FIG. 3 illustrates a cross-sectional view of an apparatus 300 with vibration-damping foam 315 for privacy and/or security protection of one or more personal communication devices (e.g., the personal communication devices 120, FIG. 1), in accordance with some embodiments. As explained above with reference to FIG. 1, in some embodiments, the apparatus 300 for privacy and security protection can include a housing assembly, which further comprises a first housing portion (e.g., a lid portion 305) and a second housing portion (e.g., a base portion 310). In addition to the physical barrier formed by the housing assembly for privacy and/or security protection, in some embodiments, the enclosure inside the apparatus 300 is filled with vibration-damping foam 315. The vibration-damping foam 315 can exclude (i.e., displace) sound propagation media (e.g., air) and provide damping of the enclosure vibration caused by exterior sound.

As shown in FIG. 3, in some embodiments, each of the portion 305 and 310 of the apparatus 300 can be at least partially filled with the vibration-damping foam 315. Further, in some embodiments, one side of each of the vibration-damping foam 315 can be shaped or otherwise contoured (e.g., as a trough and/or depression 325) to accommodate and/or cradle at least a portion of a personal communication device (not shown). For example, at least a portion of the surface of the vibration-damping foam 315 can comprise a high-deformation material. When the personal communication device is placed on the surface, the high-deformation material is deformed to cradle at least a portion of the personal communication device. For example, the cradling of an opening of a microphone of the personal communication device can at least partially seal the audio path to the microphone of the personal communication device. In some embodiments, at least a portion of the vibration-damping foam 315 is made of gel-like material 345 that absorbs sound. As such, the vibration-damping foam 315 prevents, reduces, or limits the sound waves from passing the vibration-damping foam 315, thereby shielding the enclosed personal communication from capturing ambient sound outside the enclosure and preventing the sound generated inside the enclosure from escaping the enclosure.

In some embodiments, the vibration-damping foam 315 has one or more slots, windows, or openings to at least partially support devices for active acoustical attenuation, e.g., to at least partially support speakers 340-1, 340-2, and 340-3. The openings allow the masking signals outputted by the speakers 340 to pass into the enclosure. The masking signals provides active acoustical attenuation, as will be described below with reference to FIGS. 4 and 5. When the speakers 340 output the masking signal directed to the one or more personal communication devices placed on the surface of the vibration-damping foam 315, the vibration-damping foam 315 can reduce the amount of noise from leaking out of the enclosure, thereby reducing the obtrusiveness of the masking signal to the environment.

Figure 4:
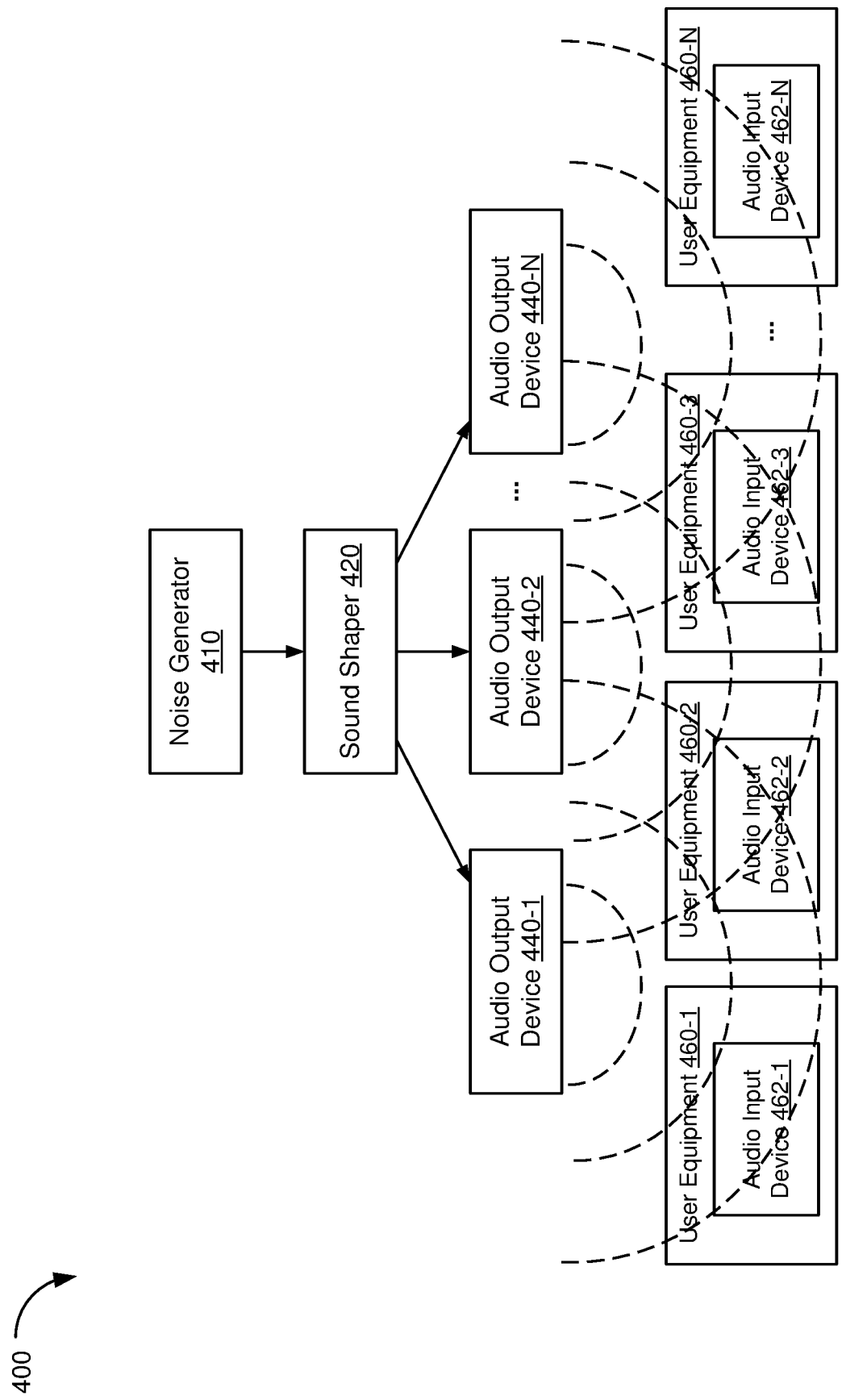
FIG. 4 is an illustration of an apparatus providing active privacy and/or security protection of user equipment in accordance with some embodiments.

Referring now to FIG. 4, FIG. 4 depicts a simplified block diagram of an apparatus 400 providing active privacy and/or security protection of user equipment (e.g. one or more personal communication devices 460), in accordance with some embodiments. In some embodiments, the apparatus 400 includes components and structures as shown in FIGS. 1-3 to provide passive acoustical attenuation. In addition to the passive acoustical attenuation, in some embodiments, the apparatus 400 includes a noise generator 410, a sound shaper 420, and one or more audio output devices 440 to provide active acoustical attenuation. The passive and active acoustical attenuation allows effective sealing of the audio path to the one or more enclosed personal communication devices 460.

It should be noted that while the aforementioned features and components are illustrated, those of ordinary skill in the art will appreciate from the present disclosure that various other features and components have not been illustrated for the sake of brevity and so as not to obscure more pertinent aspects of the embodiments disclosed herein. Also, those of ordinary skill in the art will appreciate from the present disclosure that the functions of the components described below can be combined into one or more components and/or further sub-divided into additional sub-components; and, that the components described below are provided as exemplary configuration of the various aspects and functions described herein.

To that end, as a non-limiting example, in some embodiments, the noise generator 410 generates one or more noise signal streams as masking signals and provides the masking signals to the sound shaper 420. In some embodiments, the masking signals from the noise generator 104 include a random (or pseudo-random) number sequence. In some embodiments, the masking signals are generated within a digital signal processer (DSP), field programmable gate array (FPGA), application-specific integrated circuit (ASIC), microprocessor, and/or by the firmware/software (e.g., through the use of pseudo random number generators and/or algorithms such as AES encryption with various key lengths etc.). In other embodiments, the masking signals are generated by external or dedicated electronic components, such as a diode or a resistor that generates electronic noise. In some embodiments, the masking signals are generated by applying power to the resistor and/or by the diode in breakdown mode and measuring and/or sampling the noise created. In some embodiments, one masking signal can be used as a random seed to generate multiple uncorrelated noise signal streams, e.g., by reusing the same seed or sampling such seed at pre-determined or randomized intervals to produce uncorrelated masking signal streams in order to mask two or more audio input devices. As used herein, a random seed is a number (or vector) used to initialize a random or pseudorandom number generator.

In some embodiments, the sound shaper 420 is coupled to the noise generator 410. The sound shaper 420 receives the one or more noise signal streams and produces shaped masking signals. The sound shaper 420 shapes the masking signals by modifying characteristics of the masking signal, e.g., by spectral shaping and/or adjusting the amplitude, etc. In some embodiments, the sound shaper 420 receives feedbacks for calibration. The sound shaper 420 thus can produce a desired output frequency response through a feedback loop, as described in detail below with reference to FIG. 5.

Connectable to the sound shaper 420 are the one or more audio output devices, e.g., the speakers 440-1, 440-2, . . . , 440-N. The one or more audio output devices 440 receive the shaped masking signals and outputs audio sound (e.g., noise) as a function of the shaped masking signals. The audio sound outputted by the one or more audio output devices 440 is directed to one or more audio input devices 462 of the one or more user equipment 460, e.g., directed to the microphone 462-1, 462-2, 462-3, . . . , 462-N of the user equipment 460-1, 460-2, 460-3, . . . , 460-N.

In some embodiments, the apparatus 400 includes a controller (not shown) that instructs the different audio output devices 440 to play different audio content (e.g., pass-through, noise, modified, processed, manipulated or otherwise changed content). As such, the mixture of the uncorrelated masking signals from the different audio output devices 440 (e.g., the mixture of uncorrelated masking signal from audio output devices 440-1 and 440-2 directed to the audio input device 462-2 of the user equipment 460-2) obscures the information captured by the audio input device 462-2 and it is more difficult to extract content from information captured by the audio input device 462-2. Embodiments of the controller include hardware, software, firmware, or a combination thereof. In some embodiments, the controller is a processor that executes instructions stored in non-transitory memory of the apparatus 400 in order to perform at least certain functions of the noise generation and sound shaping.

Figure 5:
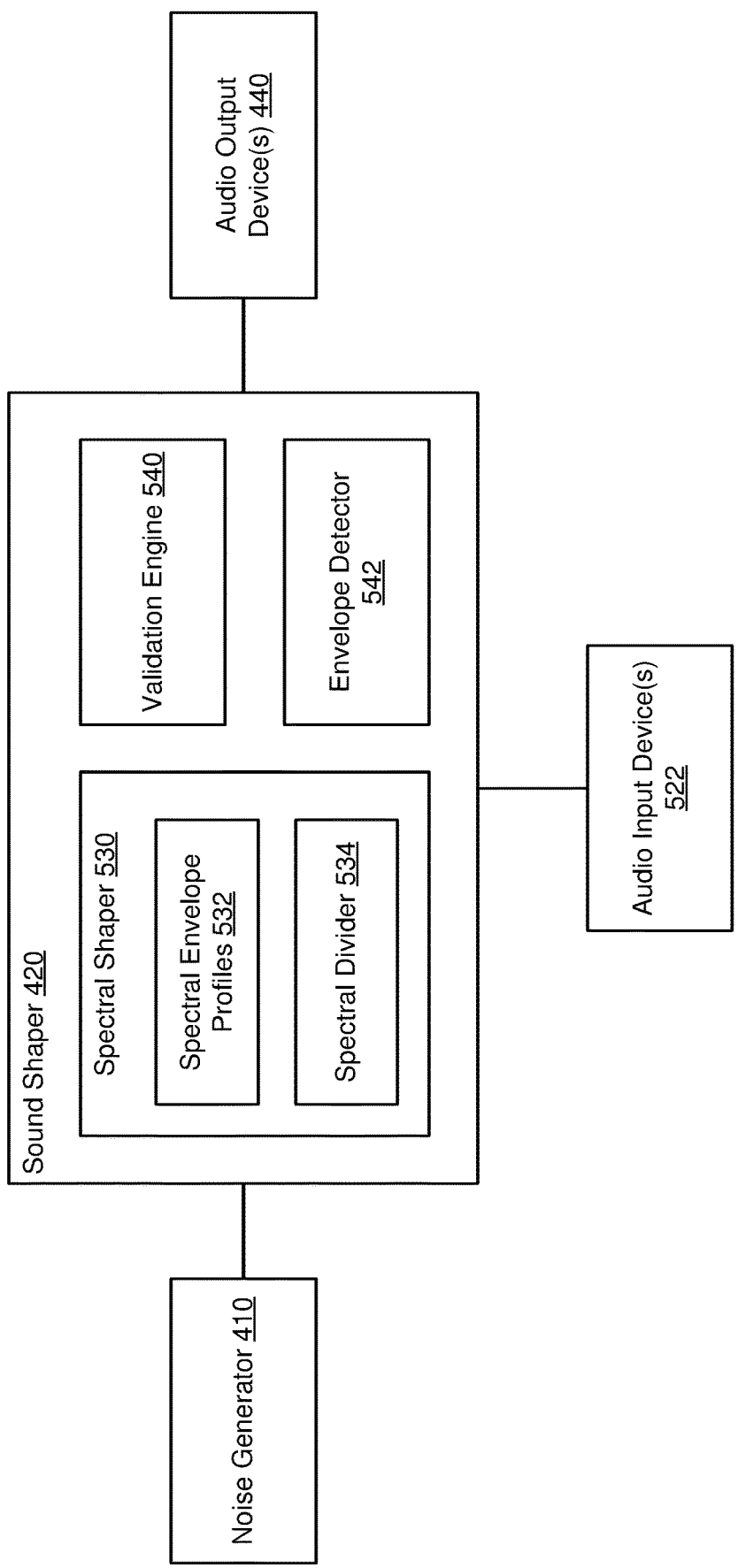
FIG. 5 is a block diagram of an exemplary apparatus for privacy and/or security protection in accordance with some embodiments.

Turning to FIG. 5, FIG. 5 is a simplified block diagram of components of the apparatus 400, including the noise generator 410, the sound shaper 420, and the audio output device(s) 440, in accordance with some embodiments. As described above with reference to FIG. 4, in some embodiments, the noise generator 410 is a random number generator providing a random or pseudorandom number sequence to the sound shaper 420. In some embodiments, the sound shaper 420 includes a spectral shaper 530 performing the spectral shaping of the noise signal, a validation engine 540 providing a feedback loop to the sound shaper 420, and an envelope detector 542 coupled to one or more audio input devices 522 of the apparatus 400 providing ambient sound information to the validation engine 540. In some embodiments, the spectral shaper 130 further includes spectral envelope profiles 532 and a spectral divider 534. It should be noted that while the aforementioned features and components are illustrated, those of ordinary skill in the art will appreciate from the present disclosure that various other features and components have not been illustrated for the sake of brevity and so as not to obscure more pertinent aspects of the embodiments disclosed herein. Also, those of ordinary skill in the art will appreciate from the present disclosure that the functions of the components described below can be combined into one or more components and/or further sub-divided into additional sub-components; and, that the components described below are provided as exemplary configuration of the various aspects and functions described herein.

To that end, as a non-limiting example, the spectral shaper 530 maintains the spectral envelope profiles 532, and each spectral envelope profile of the spectral envelope profiles 532 specifies spectral characteristics or other desirable characteristics for audio signal shaping. For example, a spectral envelope profile 532 can comprise frequency patterns of noise (e.g., white, blue, pink, gray, etc.) for shaping the audio signal. In another example, a spectral envelope profile 532 comprises masking signal characteristics corresponding to wind noise, traffic sound, music, or other voice for shaping the audio signal. In yet another example, a spectral envelope profile 532 specifies audio signal shaping parameters for different frequency bands. In some embodiments, the user can activate, deactivate, obtain, or select one or more spectral envelope profiles 532 through the use of switches, buttons or other such physical interface included in or at least partially supported by the apparatus 400. In some other embodiments, such features or capabilities can be triggered by movements, motion, remote control(s) such as RF, infrared, or other wired or wireless technology or sound such as a spoken keyword or phrase.

In some embodiments, the spectral shaper 530 increases or decreases different frequency bands according to a spectral envelope profile retrieved from the spectral envelope profiles 532. In order to shape different frequency bands, in some embodiments, the spectral shaper 530 includes a spectral divider 534 that breaks the audio signal into a set of frequency bands. The spectral shaper 530 then uses a spectral selector to select at least one of the set of frequency bands to apply the spectral envelope corresponding to the retrieved spectral envelope profile 532. As such, different frequency bands are shaped or adjusted according to the parameters specified by the spectral envelope.

In some embodiments, the validation engine 540 is coupled to the envelope detector 542 and the spectral shaper 530 to form a feedback loop. Mechanical (e.g., the sound attenuation layer 215 in FIG. 2 and/or the vibration-damping foam 315 in FIG. 3) and electrical components (e.g., the amplifiers and/or the audio output devices 440, etc.) have native frequency response. The native frequency response needs to be compensated in order to achieve the desired audio frequency response. In some embodiments, the spectral shaper 530 is calibrated by sensing (e.g., using the audio input device(s) 522 of the apparatus 400) and taking the native frequency response measurement followed by correcting the audio signal.

In order to provide the feedback, in some embodiments, the validation engine 540 includes a spectral validator and an amplitude validator. In some embodiments, the spectral validator is operable to obtain a frequency response to the audio signal from the envelope detector 542, which is further coupled to the audio input device(s) 522 of the apparatus 400. The audio input device(s) 522, in some embodiments, captures the audio signal outputted by the audio output device(s) 440 and provides the audio signal to the envelope detector 542 for measurement. The spectral validator then obtains the measurement from the envelope detector 542 in order to derive the frequency response. The frequency response is then provided to the spectral shaper 530 and causes the spectral shaper 530 to adjust the shaped audio signal as a function of the frequency response.

In some embodiments, the amplitude validator obtains the level of ambient sound from the envelope detector 542. The amplitude validator then compares the level of ambient sound with the level or amplitude of the output noise signal in order to determine whether or not the shaped audio signal is at the appropriate level for masking the ambient sound. Based on the comparison result, in some embodiments, through the coupling with the audio output device(s) 440, the amplitude validator directs the speaker(s) 440 to adjust the output audible sound level, in case the output audible sound level is not appropriate (e.g., too high or too low) for masking ambient sound.

Figure 6:
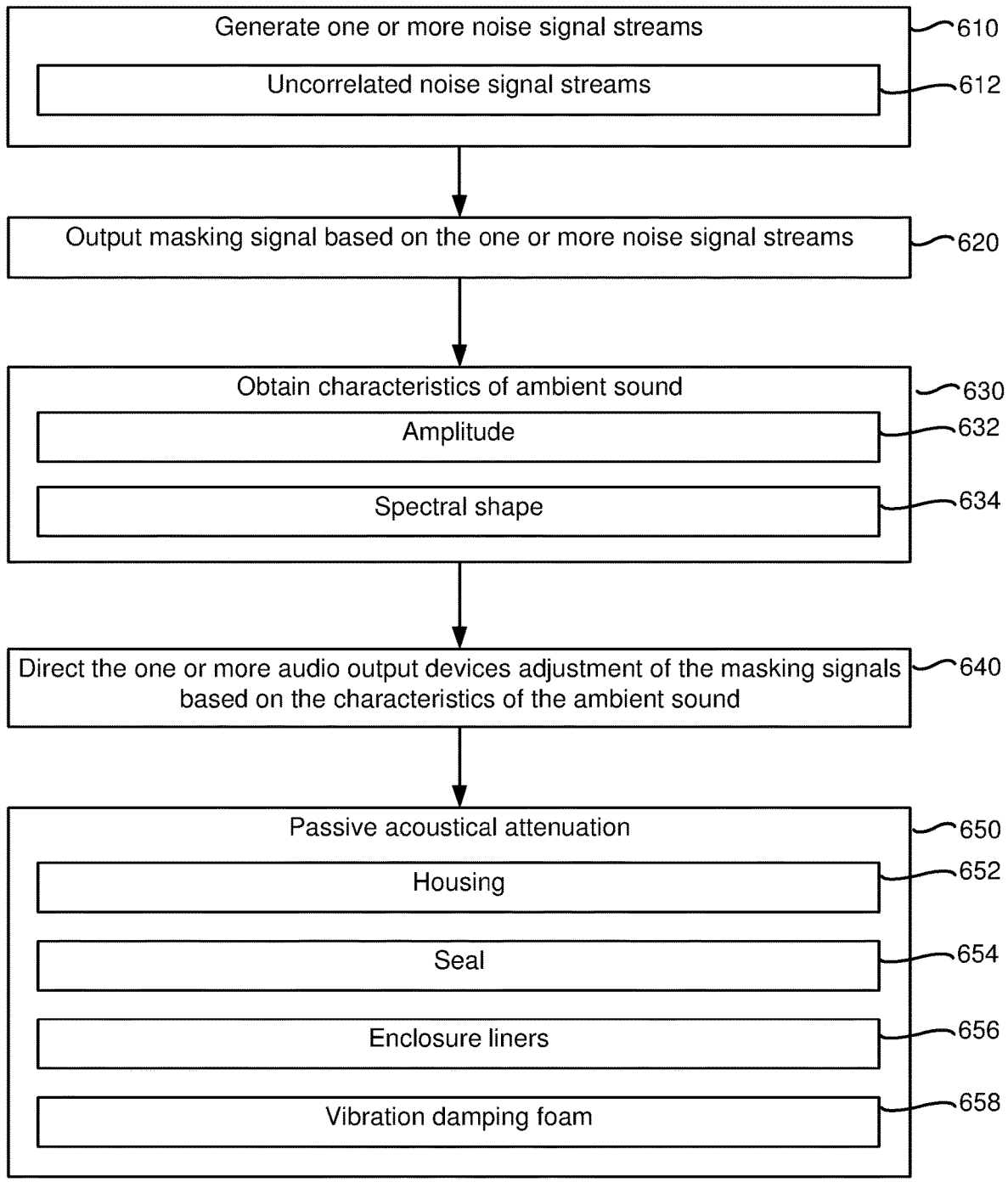
FIG. 6 is a flowchart illustrating a method for audio path sealing in accordance with some embodiments.

FIG. 6 is a flowchart representation of a method 600 for audio path sealing, in accordance with some embodiments. In some embodiments, the method 600 is performed at an apparatus (e.g., the apparatus 100 in FIG. 1, the apparatus 200 in FIG. 2, and/or the apparatus 300 in FIG. 3) with a controller (e.g., a processor), a non-transitory memory storing instructions for execution by the controller, a noise generator (e.g., the noise generator 410), one or more audio input devices (e.g., the audio input device(s) 522, FIG. 5), one or more audio output devices (e.g., the speaker(s) 140 in FIG. 1, the speaker(s) 240 in FIG. 2, the speakers 340 in FIG. 3, and/or the audio output device(s) 440 in FIGS. 4 and 5). Briefly, the method 600 includes steps of active acoustical attenuation in order to protect one or more enclosed personal communication devices. The active acoustical attenuation, combined with passive acoustical attenuation provided by the physical structure of the apparatus, seals the audio path to the one or more enclosed personal communication devices. The audio path sealing thus prevents potential privacy invasion of the users of the one or more enclosure personal communication devices.

To that end, as represented by block 610, the method 600 includes generating, by the noise generator (e.g., the noise generator 410), one or more noise signal streams. In some embodiments, the one or more noise signal streams are true or pseudo randomized noise signal streams. In some embodiments, the noise signal streams are generated based on audio signals captured by the one or more audio input devices 522 (FIG. 5) of the apparatus, e.g., by distorting and/or obfuscating the ambient sound, or prerecorded random audio signal. In some embodiments, as represented by block 612, the noise signal streams are uncorrelated. For example, one masking signal from the noise generator (e.g., the noise generator 410) can be used as a random seed to generate multiple uncorrelated noise signal streams, e.g., by reusing the same seed or sampling such seed at pre-determined or randomized intervals to produce uncorrelated masking signal streams in order to mask two or more audio input devices of the enclosed personal communication devices.

In some embodiments, the uncorrelated masking signal streams are generated by first generating a key generated by a key generator. The key is then fed to the true or pseudo random number generator to generate a random number sequence. Through sampling, windowing, or other number sequence dividing mechanisms, the random number sequence is divided into subsets and each random number sequence is provided to a true or pseudo random number generator as a seed to produce the plurality of uncorrelated masking signal streams.

In some embodiments, the random number sequence generated by a true or pseudo random number generator can be a long sequence. In such embodiments, instead of using a portion of the random number sequence as a seed to generate more random numbers, the key generator divides the random number sequence produced by the true or pseudo random number generator into smaller portions, and the randomizing chains use the smaller portions to produce discrete random number sequences.

In some embodiments, as represented by block 620, the method 600 includes outputting, by the one or more audio output devices (e.g., the speaker(s) 140 in FIG. 1, the speaker(s) 240 in FIG. 2, the speakers 340 in FIG. 3, and/or the audio output device(s) 440 in FIGS. 4 and 5), noise signal based on the one or more noise signal streams, where the noise signal is directed at one or more personal communication devices inside the enclosure of the apparatus. For example, as shown in FIGS. 1 and 4, once the apparatus is closed, the speakers direct the noise signal at the enclosed personal communication devices. As such, the noise signal actively masks, blocks, attenuates, distorts, confuses, reduces, and/or eliminates the ability of the audio input devices of the enclosed personal communication devices.

In some embodiments, as represented by block 630, the method 600 includes obtaining, through the one or more audio input devices (e.g., the audio input device(s) 522, FIG. 5), characteristics of ambient sound outside the enclosure of the apparatus. For example, microphone(s) can be placed outside the apparatus, installed on the exterior surface of the apparatus, or embedded in the housing of the apparatus, so that the microphone(s) can record the ambient sound from the surroundings. In some embodiments, as shown in FIG. 5, the validation engine 540 and/or the envelope detector 542 are coupled to the audio input device(s) 522, so that the amplitude, as represented by block 632, and/or spectral shape, as represented by block 634 are obtained as characteristics of the ambient sound.

In some embodiments, as represented by block 640, the method 600 includes directing the one or more audio output devices, by the controller, adjustment of the noise signal based on the characteristics of the ambient sound. For example, as explained above with reference to FIG. 5, the validation engine 540 is coupled to the envelope detector 542 and the spectral shaper 530 to form a feedback loop. The envelope detector 542 measures the ambient sound recorded by the audio input device(s) 522, and the validation engine 540 obtains the measurement from the envelope detector 542 in order to derive the frequency response and/or the amplitude of the ambient sound. The frequency response is then provided to the spectral shaper 530 and causes the spectral shaper 530 to adjust the shaped audio signal as a function of the frequency response, and the validation engine 540 directs the audio output device(s) 440 to adjust the output audible noise level based on a determination that the output noise level is not appropriate (e.g., too high or too low) for masking ambient sound.

Still referring to FIG. 6, in addition to the active acoustical attenuation described above as represented by blocks 610-640, in some embodiments, the method 600 includes passive acoustical attenuation, as represented by block 650. For example, as represented by block 652, the enclosure can be formed by a first housing portion and a second housing portion, when mated, the first housing portion and the second housing portion at least partially block the one or more personal communication devices from receiving audio signal from outside the enclosure. In such embodiments, the housing can also at least partially block the masking signal from escaping to the outside environment. In another example, as represented by block 654, the first housing portion and the second housing portion provide a seal (e.g., a single or dual groove structure with flexible material covering the groove as shown in FIGS. 2 and 3) to attenuate sound. In yet another example, as represented by block 656, the enclosure is surround by an enclosure liner, and the enclosure liner includes the at least one sound attenuation layer, e.g., the liners 215 as shown in FIG. 2. In yet another example, as represented by block 658, as represented by block 656, the at least one sound attenuation layer is made of relatively soft materials, e.g., the vibration-damping foam 315 is made of and/or filled with gel-like material 345, as shown in FIG. 3.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. An apparatus comprising:
 a first housing portion and a second housing portion arranged to receive and enclose one or more personal communication devices;
 at least one sound attenuation layer, disposed in the second housing portion, the at least one sound attenuation layer absorbs sound;
 a noise generator operable to provide uncorrelated noise signal streams, wherein the noise generator includes a random number generator operable to provide a random number sequence, a key generator coupled to the random number generator operable to receive the random number sequence and synthesize the random number sequence to generate a plurality of keys, and a plurality of randomizing chains coupled to the key generator, each is operable to receive a corresponding key from the key generator and provide a respective discrete random number sequence as a respective noise signal stream based on the corresponding key; and
 one or more audio output devices, at least partially supported by the first housing portion and coupled to the noise generator to receive the uncorrelated noise signal streams, operable to output uncorrelated masking signals based on the uncorrelated noise signal streams and direct the uncorrelated masking signals at the one or more personal communication devices placed adjacent the at least one sound attenuation layer.

2. The apparatus of claim 1, wherein the first housing portion and the second housing portion, when mated to form a housing assembly, at least partially block the one or more personal communication devices from receiving audio signal from outside the housing assembly.

3. The apparatus of claim 1, wherein the first housing portion and the second housing portion provide a seal to attenuate sound.

4. The apparatus of claim 1, further comprising an enclosure liner, wherein the enclosure liner includes the at least one sound attenuation layer.

5. The apparatus of claim 1 further comprising an envelope detector operable to estimate a level of ambient sound in which the apparatus is operating.

6. The apparatus of claim 5 further comprising a validation engine, coupled to the envelope detector, operable to obtain the level of ambient sound from the envelope detector and determine whether or not a level of the masking signals is appropriate for the level of ambient sound.

7. The apparatus of claim 6, wherein the validation engine is coupled to the audio output device to direct the audio output device to adjust the level of the noise signal based on a determination that the level of the masking signals is not appropriate for the level of ambient sound.

8. The apparatus of claim 1, wherein the key generator divides the random number sequence into the plurality of keys, and each of the plurality of randomizing chains provides a respective key of the plurality of keys as the respective uncorrelated discrete random number sequence.

9. The apparatus of claim 1 further comprising a spectral shaper, coupled to the one or more audio output devices, operable to apply a spectral envelope to the masking signals in order to produce shaped audio signals coupled to the one or more audio output devices.

10. A method comprising:
at an apparatus including a controller, a noise generator, one or more audio input devices, one or more audio output devices, and an enclosure:
generating, by the noise generator, uncorrelated noise signal streams, including generating a random number sequence, synthesizing the random number sequence to generate a plurality of keys, and providing a plurality of uncorrelated discrete random number sequences as the uncorrelated noise signal streams, wherein a respective uncorrelated discrete random number sequence of the plurality of uncorrelated discrete random number sequences is based on a corresponding key of the plurality of keys;
outputting, by the one or more audio output devices, masking signals based on the uncorrelated noise signal streams, wherein the masking signals are directed at one or more personal communication devices inside the enclosure;
obtaining, through the one or more audio input devices, characteristics of ambient sound outside the enclosure; and
directing the one or more audio output devices, by the controller, adjustment of the masking signals based on the characteristics of the ambient sound.

11. The method of claim 10, wherein synthesizing the random number sequence to generate the plurality of keys includes dividing the random number sequence into the plurality of keys, and the respective uncorrelated discrete random number sequence is a respective key of the plurality of keys.

12. The method of claim 10, wherein the characteristics of the ambient sound includes a level of the ambient sound.

13. The method of claim 12, wherein the adjustment of the masking signals includes:
determining whether or not a level of the masking signals is appropriate for the level of the ambient sound; and
directing the audio output device to adjust the level of the masking signals based on a determination that the level of the masking signals is not appropriate for the level of the ambient sound.

14. The method of claim 10, wherein the adjustment of the masking signals based on the characteristics of the ambient sound includes applying a spectral envelope to the masking signals in order to produce shaped audio signals.

15. The method of claim 10, wherein the enclosure is formed by a first housing portion and a second housing portion, when mated, the first housing portion and the second housing portion at least partially block the one or more personal communication devices from receiving audio signal from outside the enclosure.

16. The method of claim 14, wherein the first housing portion and the second housing portion provide a seal to attenuate sound.

17. The method of claim 10, wherein the enclosure is surrounded by an enclosure liner, and the enclosure liner includes the at least one sound attenuation layer.

18. The method of claim 10, further comprising:
selecting at least two spectral envelope profiles; and
applying the at least two spectral envelope profiles to the masking signals.

19. The method of claim 10, further comprising:
obtaining native frequency response of components of the apparatus; and
calibrating the adjustment of the masking signals based on the native frequency response.

20. The method of claim 19, wherein the components of the apparatus include one or more of mechanical and electrical components of the apparatus.

* * * * *